July 29, 1930.  H. A. BLANCHARD  1,771,570
LAUNDRY TRAY
Filed April 25, 1930   2 Sheets-Sheet 1
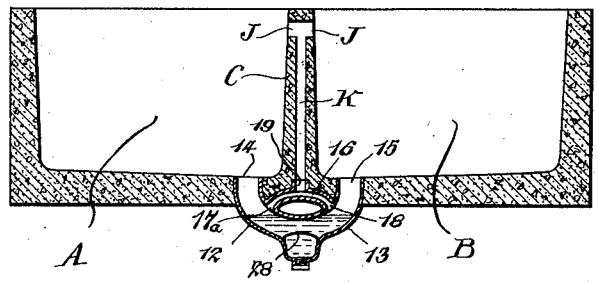
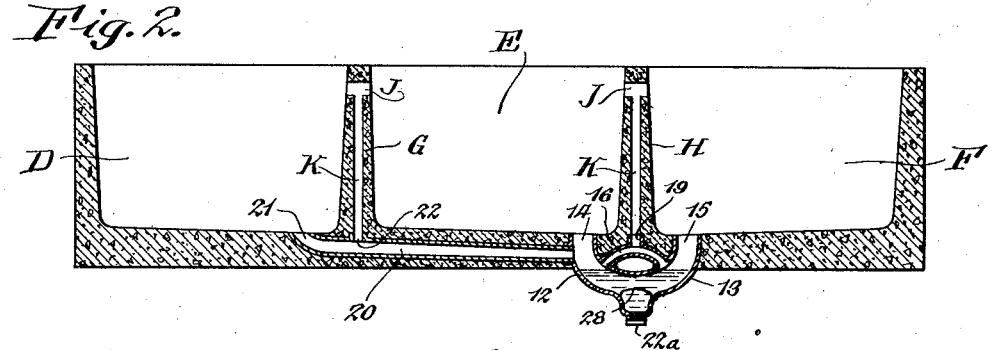
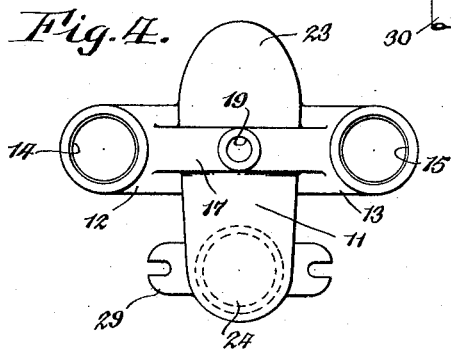
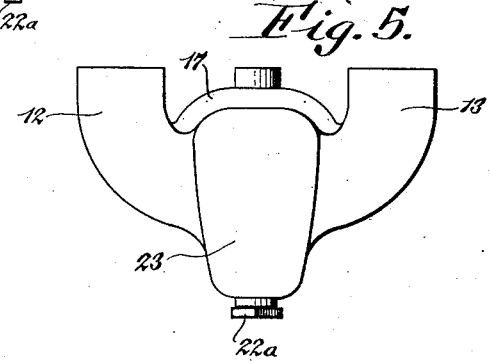
Inventor
Hymen A. Blanchard
By Popp and Powers.
Attorney July 29, 1930.  H. A. BLANCHARD  1,771,570
LAUNDRY TRAY
Filed April 25, 1930   2 Sheets-Sheet 2
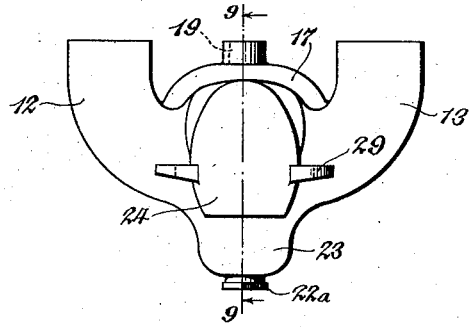
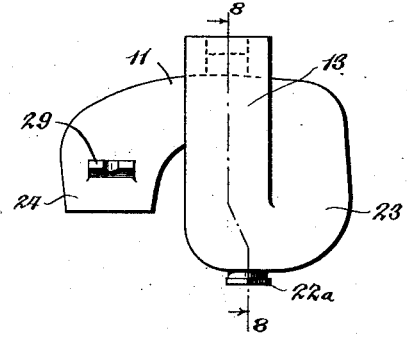
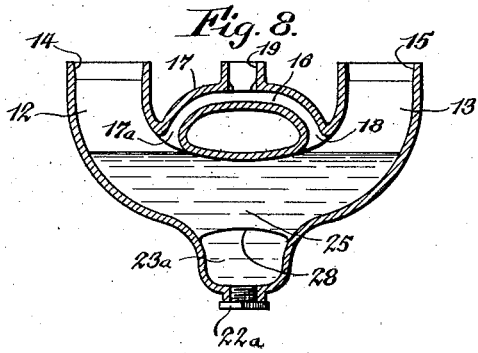
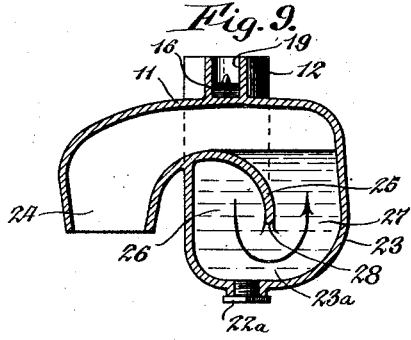
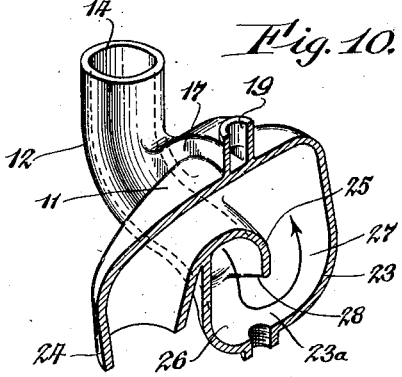
Inventor
Hymen A. Blanchard
By Popp and Powers
Attorney Patented July 29, 1930

1,771,570

UNITED STATES PATENT OFFICE

HYMEN A. BLANCHARD, OF BUFFALO, NEW YORK

LAUNDRY TRAY

Application filed April 25, 1930. Serial No. 447,369.

This invention relates to improvements in laundry trays and more particularly to a combined drainage and trap fitting for such trays which is designed with particular reference to the requirements of trays formed with a plurality of compartments.

One object of the invention is a fitting of the kind generally described which is compact in construction and which as a result thereof permits of ready access for purposes of installation and cleaning.

A further object is a fitting which is partially embedded in the bottom of the tray when it is cast, such a construction eliminating possibility of mistake in the size of trap selected at the point of installation and also enabling a saving in labor costs.

A still further object is a fitting which is self-cleaning.

The invention is illustrated in the accompanying drawings, in which:—

Figure 1 is a sectional view of a fitting constructed in accordance with the invention, as applied to a two-tray laundry unit.

Figure 2 is a sectional view of a similar fitting modified to meet the requirements of a three-tray laundry unit.

Figure 3 is a fragmentary side view showing in elevation a portion of a tray and a fitting partially embedded therein, the latter being connected to a suitable waste pipe.

Figure 4 is a top view of a fitting designed for a two-tray unit.

Figure 5 is a rear view of the same.

Figure 6 is a front view of the fitting.

Figure 7 is a side view of the same.

Figure 8 is a section taken along line 8—8 of Fig. 7.

Figure 9 is a section taken along line 9—9 of Fig. 6.

Figure 10 is a sectional perspective of the fitting.

The combined waste and trap fitting is illustrated in Figures 1 and 2 in connection with two and three compartment laundry trays. It is to be understood, however, that the number of compartments may be varied as circumstances may require, the two embodiments shown being merely for purposes of illustration. As shown and preferred, the fitting is partially embedded in the tray when cast. In Figure 1 a tray having two compartments A and B is cast as a unit, the compartments being separated by the partition C, while in Figure 2 the tray comprises three compartments D, E and F cast as a unit, the intermediate compartment E being separated from the compartment D by a partition G and from the compartment F by a partition H.

The fitting, as illustrated, in Figure 1 is partially embedded in the tray beneath the partition C. It includes a hollow body 11 (Fig. 4) which extends lengthwise of the said partition and is provided with transversely extending drainage arms 12 and 13 which are formed on a common curve. The said arms extend to either side of the partition C, the arm 12 being in communication through its mouth 14 with the compartment A and the arm 13 being in communication through its mouth 15 with the opposite compartment B.

The partition C is provided with overflow openings J near its top which communicate with a downwardly extending overflow passage K which is formed in the partition. The passage K is in communication with both of the drainage arms 12 and 13 by virtue of a duct 16 provided by a hollow rib 17 formed upon and straddling the body 11 of the fitting, the said duct opening into the arm 12 as at 17ª, into the arm 13 as at 18 and being in communication with the overflow passage K through an opening 19 formed between the ends of the rib 17.

When the fitting is applied to a three compartment tray as illustrated in Figure 2, it includes an elongated tubular branch or extension 20 which may communicate with either of the drainage arms of the fitting. In the illustrated embodiment, the drainage branch is connected at its inner end to the arm 12 and is provided at its opposite end with a discharge mouth 21 which is in communication with the compartment D. The branch 20 is provided with a second discharge opening 22 which communicates with the overflow passage in the partition G. The extension 20 is preferably tapered toward its inner end and is inclined downwardly from the mouth 21 to the point at which it is connected to the arm 12 thereby to facilitate the drainage flow of the water in the compartment D and to deliver such water to the arm 12 at a point and in a direction which will prevent backing up in either of the other two compartments. The tapering of the extension accelerates the flow of water through it and facilitates the continuous removal of the solid materials.

In accordance with the invention, the body 11 is formed with a downwardly extending portion 23 (Figs. 5, 7 and 9) which provides a chamber 23$^a$ common to both drainage arms and through which all of the water from the various compartments of the tray must pass on its way to the discharge nipple 24, the latter being an extension of the body of the fitting. The chamber 23$^a$ is divided by a wall 25 into inlet and outlet parts 26 and 27 respectively. Communication between the two said parts is afforded by an opening 28 in the wall 25 at the bottom of the chamber. Thus, using either Figures 9 or 10 for illustration, water from the tray entering the arm 12 either through its mouth 14 or the overflow mouth 17 passes from the inlet part 26 of the chamber through the opening 28 into the outlet part 27 of the chamber and out through the nipple 24.

From the foregoing it will be apparent that as the water from either of the drainage arms must enter the inlet side 26, pass through the opening 28 and up over the dam provided by the wall 25 before it can discharge through the nipple 24, a trap is provided in which water is maintained substantially at the level indicated in Figures 8 and 9, this body of water sealing the passages between the waste pipe line and the tray. An opening may be found in the bottom of the body portion 26 of the fitting for cleaning purposes, which opening may be suitably closed as by a threaded plug 22$^a$.

One method by which the fitting may be connected to the waste pipe is shown in Figure 3 in which ears 29 are formed on the nipple 24, the connection between the waste pipe 30 and the fitting being effected by a clamping ring 31 and suitable nut and bolt fastenings.

It is to be noted that the passage which the waste water takes through the trap is such as to facilitate its rapid flow and hence prevent settling of solid materials in the bottom of the fitting. Further, the duct 16, when not availed of in its overflow capacity permits mixing of air with the water before it enters the chamber 23$^a$ and hence prevents the water which is to form the seal from being siphoned off.

The combined trap and fitting is compact in construction and this together with the fact that it is partially embedded in the tray with which it is associated results in additional space beneath the tray and thereby enables ready access for purposes of installation and cleaning. The combination of a trap and drainage fitting as a part of the tray has the further advantage that time and labor is saved in installation and possibilty of the wrong size trap being selected for any particular tray is eliminated.

Having described my invention, I claim:—

1. In combination, a laundry tray unit and a combined drainage and trap fitting cast in the bottom of said unit, said fitting having a hollow body which provides a chamber, a drainage arm in communication with a compartment of said tray and with said chamber, said body being formed with an outlet passage which extends from said chamber from a point above the opening of communication between it and said drainage arm thereby to enable sealing of the said opening.

2. In combination, a laundry tray unit and a combined drainage and trap fitting cast in the bottom of said unit, said fitting having a hollow body which provides a chamber, a drainage arm in communication with a compartment of said tray and with said chamber and a second drainage arm in communication with another compartment of said tray and with said chamber, said body being formed with an outlet passage which extends from said chamber from a point above the openings of communication between it and said drainage arms thereby to enable sealing of said openings.

3. In combination, a laundry tray unit and a combined drainage and trap fitting cast in the bottom of said unit, said fitting having a hollow body which provides a chamber, a drainage arm in communication with a compartment of said tray and with said chamber and a second drainage arm in communication with another compartment of said tray and with said chamber, said body being formed with an outlet passage which extends from said chamber from a point above the openings of communication between it and said drainage arms downwardly to a point opposite said openings thereby to enable sealing of said openings.

4. In combination, a laundry tray unit and a combined drainage and trap fitting cast in the bottom of said unit, said fitting having a hollow body providing a chamber, a drainage arm in communication with a compartment of said tray and with said chamber and means formed in said body and in communication with an overflow passage of said tray for conducting any overflow to said arm, said body also being formed with an outlet passage which extends from said chamber from a point above the opening of communication between it and said drainage arm thereby to enable sealing of the said opening.

5. In combination, a laundry tray unit and a combined drainage and trap fitting cast in the bottom of said unit, said fitting having a hollow body providing a chamber, a drainage arm in communication with a compartment of said tray and with said chamber, a second drainage arm in communication with another compartment of said tray and with said chamber and means formed in said body and in communication with an overflow passage in said tray for conducting any overflow to said arms, said body also being formed with an outlet passage which extends from said chamber from a point above the openings of communication between it and said drainage arms thereby to enable sealing of said openings.

6. In combination, a laundry tray unit and a combined drainage and trap fitting cast in the bottom of said unit, said fitting having a hollow body providing a chamber, a drainage arm in communication with a compartment of said tray and with said chamber and a hollow rib formed on said body and providing a passage which communicates with an overflow passage of said tray, said body also being formed with an outlet passage which extends from said chamber from a point above the opening of communication between it and said drainage arm thereby to enable sealing of said opening.

7. In combination, a laundry tray unit and a combined drainage and trap fitting cast in the bottom of said unit, said fitting having a hollow body providing a chamber, a drainage arm in communication with a compartment of said tray and with said chamber, a second drainage arm in communication with another compartment of said tray and with said chamber, and a hollow rib formed in said body to provide a duct connecting both of said arms with an overflow passage of said tray, said body also being formed with an outlet passage which extends from said chamber from a point above the openings of communication between it and said drainage arms thereby to enable sealing of said openings.

In testimony whereof I affix my signature.

HYMEN A. BLANCHARD.